US012504772B2

(12) United States Patent
Shen et al.

(10) Patent No.: US 12,504,772 B2
(45) Date of Patent: Dec. 23, 2025

(54) METHOD, SYSTEM AND STORAGE MEDIUM OF RESILIENT HUMAN-ON-THE-LOOP RANGE-ONLY COOPERATIVE POSITIONING OF PLURALITY OF UNMANNED AERIAL VEHICLES

(71) Applicant: Intelligent Fusion Technology, Inc., Germantown, MD (US)

(72) Inventors: Dan Shen, Germantown, MD (US); Genshe Chen, Germantown, MD (US); Khanh Pham, Kirtland AFB, NM (US); Erik Blasch, Arlington, VA (US); Yajie Bao, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 110 days.

(21) Appl. No.: 18/494,293

(22) Filed: Oct. 25, 2023

(65) Prior Publication Data

US 2025/0028337 A1   Jan. 23, 2025

Related U.S. Application Data

(63) Continuation-in-part of application No. 17/579,348, filed on Jan. 19, 2022, now Pat. No. 11,864,140.

(51) Int. Cl.
G05D 1/69     (2024.01)
G06N 7/01     (2023.01)
G05D 109/20   (2024.01)

(52) U.S. Cl.
CPC ............. *G05D 1/69* (2024.01); *G06N 7/01* (2023.01); *G05D 2109/20* (2024.01)

(58) Field of Classification Search
CPC ........ G05D 1/222; G05D 1/619; G05D 1/644; G05D 1/69; G05D 1/6987; G05D 2101/15;
(Continued)

(56) References Cited

U.S. PATENT DOCUMENTS 7,305,704 B2   12/2007   Ofek et al.
7,327,699 B1    2/2008   Schäfer
(Continued)

*Primary Examiner* — Matthew J. Reda
(74) *Attorney, Agent, or Firm* — ANOVA LAW GROUP, PLLC

(57) ABSTRACT

The present disclosure provides a method, a system and a storage medium of resilient human-on-the-loop range-only cooperative positioning of a plurality of unmanned aerial vehicles (UAVs). The method includes computing an initial exploitability using an initial distribution and an initial policy; performing a forward updating of a distribution of a portion of the plurality of UAVs, and performing a backward updating of a Q function of each UAV of the plurality of UAVs; for each time step, calculating a dual variable at an (i+1)-th iteration and calculating a policy at an (i+1)-th iteration; computing a ratio of an exploitability at the (i+1)-th iteration over the initial exploitability; and if the ratio is less than or equal to a pre-defined tolerance value, maintaining a policy at the i-th iteration; and if the ratio is greater than the pre-defined tolerance value, using the policy at the (i+1)-th iteration.

15 Claims, 9 Drawing Sheets

(58) Field of Classification Search
CPC ... G05D 2107/34; G05D 2109/20; G06N 7/01
See application file for complete search history.

(56) References Cited

U.S. PATENT DOCUMENTS

| | | |
|---|---|---|
| 7,343,619 B2 | 3/2008 | Ofek et al. |
| 7,367,045 B2 | 4/2008 | Ofek et al. |
| 7,398,398 B2 | 7/2008 | Ofek et al. |
| 7,509,687 B2 | 3/2009 | Ofek et al. |
| 7,895,643 B2 | 2/2011 | Yung et al. |
| 8,493,123 B2 | 7/2013 | Wilkinson et al. |
| 8,600,239 B2 | 12/2013 | Mani |
| 8,800,032 B2 | 8/2014 | Yung et al. |
| 9,160,473 B2 | 10/2015 | Mani |
| 9,481,459 B2 | 11/2016 | Staskevich et al. |
| 9,537,576 B2 | 1/2017 | Wu et al. |
| 9,778,368 B2 | 10/2017 | Krantz et al. |
| 10,211,969 B1 | 2/2019 | Littlepage |
| 10,291,347 B2 | 5/2019 | Wang |
| 10,338,207 B2 | 7/2019 | Wang |
| 10,389,514 B2 | 8/2019 | Sinclair |
| 10,775,749 B2 | 9/2020 | Dunn |
| 10,790,872 B1 | 9/2020 | Blanchard |
| 10,805,924 B2 | 10/2020 | Ginde |
| 11,050,458 B2 | 6/2021 | Blanchard |
| 11,082,083 B2 | 8/2021 | Blanchard |
| 11,082,084 B2 | 8/2021 | Blanchard |
| 11,146,334 B2 | 10/2021 | Wu |
| 11,175,634 B2 | 11/2021 | Dunn |
| 11,228,338 B2 | 1/2022 | Blanchard |
| 11,310,754 B2 | 4/2022 | Kim |
| 11,346,957 B2 | 5/2022 | Reis |
| 11,493,636 B2 | 11/2022 | Camparo et al. |
| 11,509,451 B1 | 11/2022 | Pham |
| 11,552,673 B2 | 1/2023 | Blanchard et al. |
| 11,638,153 B2 | 4/2023 | Reis et al. |
| 2016/0251081 A1 | 9/2016 | Staskevich et al. |
| 2018/0329047 A1 | 11/2018 | Wang et al. |
| 2021/0018878 A1 | 1/2021 | Dunn et al. |
| 2021/0075100 A1 | 3/2021 | Kwon et al. |
| 2021/0311199 A1 | 10/2021 | Reis et al. |
| 2021/0311201 A1 | 10/2021 | Reis et al. |
| 2021/0311202 A1 | 10/2021 | Reis et al. |
| 2021/0311203 A1 | 10/2021 | Reis et al. |
| 2022/0150271 A1* | 5/2022 | Shah ........................ G06N 3/08 |
| 2024/0353861 A1* | 10/2024 | Tan ...................... G05D 1/6985 |
| 2024/0395152 A1* | 11/2024 | Li ........................... G08G 5/32 |

\* cited by examiner

METHOD, SYSTEM AND STORAGE MEDIUM OF RESILIENT HUMAN-ON-THE-LOOP RANGE-ONLY COOPERATIVE POSITIONING OF PLURALITY OF UNMANNED AERIAL VEHICLES

CROSS-REFERENCE TO RELATED APPLICATION

This application is a continuation-in-part of application Ser. No. 17/579,348, filed on Jan. 19, 2022, the entire contents of which is incorporated herein by reference.

GOVERNMENT RIGHTS

The present disclosure was made with Government support under Contracts No. FA9453-23-P-A019, awarded by the United States Air Force Research Laboratory. The U.S. Government has certain rights in the present disclosure.

FIELD OF THE DISCLOSURE

The present disclosure generally relates to the field of unmanned aerial vehicle technology and, more particularly, relates to a method, a system and a storage medium of resilient human-on-the-loop range-only cooperative positioning of a plurality of unmanned aerial vehicles (UAVs).

BACKGROUND

With multi-level resilience involving preventing, responding, and recovering functions in the PNT (positioning, navigation and timing) equipment, vast majority of PNT services mandate the presence of end users with supervisory roles (e.g., human-on-the-loop), such as resilience level settings, risk tolerances, budgets, dual-purpose civil and military applications, and interferences in situations that are unfamiliar to autonomous PNT equipment. It is vital at the design phase to understand how human presence affects requirements of application performance including accuracy, availability, integrity, continuity, coverage and/or expected behaviors in resilient PNT equipment.

Human-on-the-loop can enhance the resilience of the positioning system. However, human resources are limited in processing UAV requests. An operator may be in charge of multiple UAVs. Each UAV requests human interactions based on self-evaluations by onboard algorithms and aims to maximize its own probability of fulfilling the task, which may result in excessive concurrent requests and thus slow down human processing. Therefore, analyzing the policies of UAVs to request human interactions is essential to guarantee the overall performance of multiple UAVs.

BRIEF SUMMARY OF THE DISCLOSURE

One aspect of the present disclosure provides a method of resilient human-on-the-loop range-only cooperative positioning of a plurality of unmanned aerial vehicles (UAVs). The method includes determining an initial distribution, an initial policy, and a pre-defined tolerance value by a processer; computing an initial exploitability using the initial distribution and the initial policy; for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; performing a backward updating of a Q function of each UAV of the plurality of UAVs by computing a Q function value of each UAV of the plurality of UAVs at the k-th time step using a Q function value of each UAV of the plurality of UAVs at a (k+1)-th time step; for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration; computing an exploitability at the (i+1)-th iteration and a ratio of the exploitability at the (i+1)-th iteration over the initial exploitability; and if the ratio is less than or equal to the pre-defined tolerance value, maintaining a policy at the i-th iteration for each UAV of the plurality of UAVs; and if the ratio is greater than the pre-defined tolerance value, using the policy at the (i+1)-th iteration for each UAV of the plurality of UAVs.

Another aspect of the present disclosure provides a system. The system includes a memory, configured to store program instructions for performing a method of resilient human-on-the-loop range-only cooperative positioning of a plurality of unmanned aerial vehicles (UAVs); and a processor, coupled with the memory and, when executing the program instructions, configured for: determining an initial distribution, an initial policy, and a pre-defined tolerance value by a processor; computing an initial exploitability using the initial distribution and the initial policy; for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; performing a backward updating of a Q function of each UAV of the plurality of UAVs by computing a Q function value of each UAV of the plurality of UAVs at the k-th time step using a Q function value of each UAV of the plurality of UAVs at a (k+1)-th time step; for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration; computing an exploitability at the (i+1)-th iteration and a ratio of the exploitability at the (i+1)-th iteration over the initial exploitability; and if the ratio is less than or equal to the pre-defined tolerance value, maintaining a policy at the i-th iteration for each UAV of the plurality of UAVs; and if the ratio is greater than the pre-defined tolerance value, using the policy at the (i+1)-th iteration for each UAV of the plurality of UAVs.

Another aspect of the present disclosure provides a non-transitory computer-readable storage medium, containing program instructions for, when being executed by a processor, performing a method of resilient human-on-the-loop range-only cooperative positioning of a plurality of unmanned aerial vehicles (UAVs). The method includes determining an initial distribution, an initial policy, and a pre-defined tolerance value by a processor; computing an initial exploitability using the initial distribution and the initial policy; for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step;

performing a backward updating of a Q function of each UAV of the plurality of UAVs by computing a Q function value of each UAV of the plurality of UAVs at the k-th time step using a Q function value of each UAV of the plurality of UAVs at a (k+1)-th time step; for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration; computing an exploitability at the (i+1)-th iteration and a ratio of the exploitability at the (i+1)-th iteration over the initial exploitability; and if the ratio is less than or equal to the pre-defined tolerance value, maintaining a policy at the i-th iteration for each UAV of the plurality of UAVs; and if the ratio is greater than the pre-defined tolerance value, using the policy at the (i+1)-th iteration for each UAV of the plurality of UAVs.

Other aspects of the present disclosure may be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
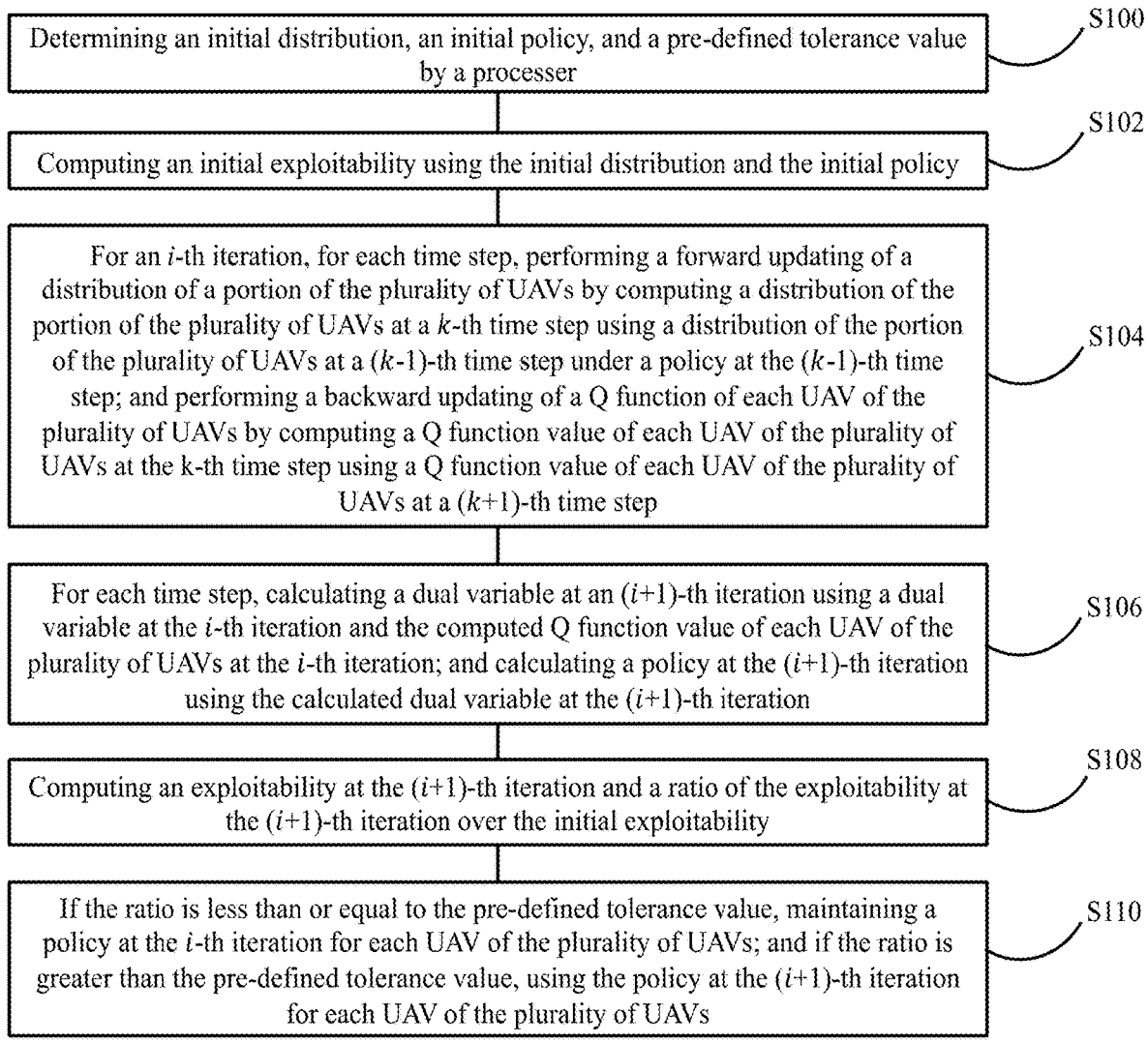
FIG. 1 depicts an exemplary method of resilient human-on-the-loop range-only cooperative positioning of a plurality of unmanned aerial vehicles (UAVs) according to various disclosed embodiments of the present disclosure.

References may be made in detail to exemplary embodiments of the disclosure, which may be illustrated in the accompanying drawings. Wherever possible, same reference numbers may be used throughout the accompanying drawings to refer to same or similar parts.

As mentioned above, it is vital at the design phase to understand how human presence affects requirements of application performance including accuracy, availability, integrity, continuity, coverage and/or expected behaviors in resilient PNT equipment. Interaction modes for human-on-the-Loop (i.e., how operator input can be combined with autonomous methods through suitable interfaces) must be specified to investigate the effects of human presence on performance.

In the present disclosure, four interaction modes are described in detail herein. For mode 1 of direct control, operators directly monitor the positioning and control the flights of UVAs. For mode 2 of waypoints planning, operators designate the trajectories for the UAVs to avoid the areas with a high probability of potential attacks. For mode 3 of final-step execution, operators take over the control of UAVs when the target areas are in the field of vision while UAVs perform motion planning and anti-attacks using the implemented algorithms. For mode 4 of full automation, operators only specify the target areas and UAVs finish the tasks automatically.

The four modes require different degrees of human involvement and suit different scenarios and levels of resilience. In the cases that the task complexity is beyond the designed processing capacity of UAVs, direct control may be necessary to fulfill the task. Considering the complexity of information processing and trajectory planning for avoiding the potential attack regions, humans may be more competent to analyze the intelligence and designate the trajectories than onboard algorithms which may require large computational resources. As the UAVs approach the target, the network configuration may not favor localization and humans can assist in the final execution. Full automation can work with guaranteed performance when real environments are similar to experimental scenarios.

Attack region is described herein in the present disclosure. It assumes that the UAVs maintain a fixed height and consider potential attack regions in the form of:

$$\Omega^{(j)} := \{x \mid \|x - o^{(j)}\|_2 \le r^{(j)}\}$$

where x denotes coordinates under an attack; and $o^{(j)}$ and $r^{(j)}$ are a center and a radius of a j-th attack region, respectively. The UAVs may be subject to distance manipulation attacks in the potential attack regions.

Localizability-constrained trajectory planning is described herein in the present disclosure. Using trajectory planning can avoid the potential attack regions and thus ease the burden of attack detection and mitigation. In particular, humans may determine potential attack regions $\Omega^{(j)}$ and then plan trajectories for the UAVs. Additionally, the network configurations of the UAVs affect the accuracy of positioning with range measurements. Prioritized planning may be configured to optimize the network configurations of the UAVs to facilitate positioning.

In the present disclosure, a graph-based roadmap may be randomly generated, and the edges that cross the attack regions may be removed. Then, an A* algorithm may be used to select paths by the Fisher information matrix (FIM)-based optimality measures one UAV by one UAV. A* algorithm is a graph traversal and path search algorithm, which is used to find the shortest path from a specified source to a specified goal. The inverse of FIM is a lower bound on the covariance matrix of any possible unbiased position estimate by Cram'er-Rao Bound (CRB). The A-optimal design that maximizes $-\text{tr}[F(p)^{-1}]$ where F(p) is the FIM with p denoting a vector of UAV positions and $\text{tr}[\cdot]$ denotes a trace operator may be used; and E-optimal design that maximizes $\lambda_{min}(F(p))$ where $\lambda_{min}(\cdot)$ denotes a minimal eigenvalue of a square matrix may also be used. Then, the operators send the selected paths to the UAVs, and the UAVs track the planned paths/waypoints to avoid the potential attack regions. Moreover, the operators can adjust the path planning based on real-time intelligence.

According to various embodiments of the present disclosure, a method of resilient human-on-the-loop range-only cooperative positioning of a plurality of unmanned aerial vehicles (UAVs) is described hereinafter. FIG. 1 depicts an exemplary method of resilient human-on-the-loop range-only cooperative positioning of a plurality of unmanned aerial vehicles according to various disclosed embodiments of the present disclosure.

At S100, an initial distribution, an initial policy, and a pre-defined tolerance value is determined by a processer (in a computing device).

At S102, an initial exploitability is computed using the initial distribution and the initial policy.

At S104, for an i-th iteration, for each time step, a forward updating of a distribution of a portion of the plurality of UAVs is performed by computing a distribution of the portion of the plurality of UAVs at a k-th time step using a distribution of the portion of the plurality of UAVs at a (k−1)-th time step under a policy at the (k−1)-th time step; and a backward updating of a Q function of each UAV of the plurality of UAVs is performed by computing a Q function value of each UAV of the plurality of UAVs at the k-th time step using a Q function value of each UAV of the plurality of UAVs at a (k+1)-th time step.

At S106, for each time step, a dual variable at an (i+1)-th iteration is calculated using a dual variable at the i-th iteration and the computed Q function value of each UAV of the plurality of UAVs at the i-th iteration; and a policy at the (i+1)-th iteration is calculated using the calculated dual variable at the (i+1)-th iteration.

At S108, an exploitability at the (i+1)-th iteration and a ratio of the exploitability at the (i+1)-th iteration over the initial exploitability are computed.

At S110, if the ratio is less than or equal to the pre-defined tolerance value, a policy at the i-th iteration is maintained for each UAV of the plurality of UAVs; and if the ratio is greater than the pre-defined tolerance value, the policy at the (i+1)-th iteration is used for each UAV of the plurality of UAVs.

In one embodiment, the dual variable at the (i+1)-th iteration is calculated by:

$$y_k^{i+1}(\bar{s}, \mu) = y_k^i(\bar{s}, \mu) + \alpha Q^{\pi_k^i}(\bar{s}, \mu)$$

where $\gamma$ denotes the dual variable, $\bar{s}$ denotes a failure probability of the UAV, $\mu$ denotes a recovery rate, $\alpha$ denotes a step size, Q denotes a Q-function, and $\pi$ denotes a policy.

In one embodiment, the policy at the (i+1)-th iteration is calculated by:

$$\pi_k^{i+1}(\cdot \mid \bar{s}) = \Gamma(y_k^{i+1}(\bar{s}, \mu))$$

where $\Gamma$ denotes a function that maps the dual variable at the (i+1)-th iteration to the policy at the (i+1)-th iteration.

In one embodiment, the method further includes inputting a plurality of discretized states and a plurality of discretized actions into a mean field game (MFG) model.

In one embodiment, a ratio of an exploitability at the (i+1)-th iteration to the initial exploitability is configured to determine early stopping of the mean field game model.

Human-on-the-loop can enhance the resilience of the positioning system. However, human resources are limited in processing UAV requests. An operator may be in charge of multiple UAVs. Each UAV requests human interactions based on self-evaluations by onboard algorithms and aims to maximize its own probability of fulfilling the task, which may result in excessive concurrent requests and thus slow down human processing. Therefore, analyzing the policy of UAVs to request human interactions is essential to evaluate the overall performance of multiple UAVs.

To analyze optimal policy of UAV requests, a dynamic resilience model is needed to describe how the probability that the UAV fulfills the task varies with time under the control input of human interactions. A service loss rate $\lambda_n$ and a recovery rate $\mu_n$ of a system may be used for modeling resilience. In particular, the event that the system crosses a service threshold $\sigma_n$ to be failed is described by:

$$\int_0^{TTF_n} \lambda_n \exp(-\lambda_n t)\, dt = \sigma_n \quad (1)$$

where TTF denotes the time-to-failure, and t denotes time. Then, the service loss rate derived from equation (1) is as follows:

$$\lambda_n = -\frac{\log(1 - \sigma_n)}{TTF_n} \quad (2)$$

Similarly, the recovery rates $\mu_n$ can be calculated using the service threshold $\sigma_n$ and the time-to-recovery (TTR) from a failure as follows:

$$\mu_n = -\frac{\log(\sigma_n)}{TTR_n} \quad (3)$$

Human interactions can increase recovery rates by verifying UAV status and providing guidance/commands. While modeling the relationship between the degree of human involvement and the recovery rates is feasible, $\mu_n$, is used as the control input to represent the recovery rate after the UAV makes requests and the human processing the requests, to simplify the problem for mean field game (MFG) analysis. Additionally, $0 \leq \underline{\mu} \leq \mu_n \leq \overline{\mu}$, where $\overline{\mu}$ and $\underline{\mu}$ denote the upper and lower bounds of $\mu_n$, respectively. The lower bound $\underline{\mu}$ is the recovery rate without human-machine interactions.

Next, the dynamics of resilience are modeled by the following equation (4):

$$\dot{s}_n(t) = \mu_n(t)s_n(t) - \lambda_n(t), \quad (4)$$
$$n = 1, 2, \cdots, N$$

Where $\dot{s}_n$ denotes the derivative of $s_n$ with respect to t, $s_n \in [0,1]$ denotes the state of the probability (i.e., SoP) of fulfilling the task, and N denotes total agent number. Additionally, the model parameters can be determined/learned from the extensive simulations of the human-on-the-loop positioning systems in as many attack scenarios as possible.

Coordinating the requests using centralized/consensus-based distributed approaches may significantly increase the communication cost, which can be prohibitive for real-time request processing in the case of large numbers of slave nodes. Instead, mean field game theory provides a tool to analyze optimal polices without the requirements of communication. In particular, the MFG theory uses a fix-dimension probability density function (PDF) rather than high-dimension augmented states from all agents to describe the system behaviors. Moreover, the PDF after agents take actions is obtained by solving a type of partial differential equation (PDE) named the Fokker-Planck-Kolmogorov (FPK) equation without communications between nodes. Then, each UAV makes its own policy by estimating aggregated requests based on the SoP of all the rest UAVs that are represented in the form of a PDF.

Since UAVs in a swarm are usually homogeneous with similar resilience, the service loss rate can be defined as a time-dependent function $\lambda(t)$ that is identical across the agents. To model the variations of recovery rates for a given degree of human interactions due to the inevitable variations of UAVs and humans performance, a random Brownian noise independent of the SoP is included in (4) and yields:

$$d\bar{s}_n(t) = [-\mu_n(t)\bar{s}_n(t) + \lambda(t)]dt + \sigma dW_n \quad (5)$$

where $\bar{s}_n = 1 - s_n$ denotes the failure probability, n is the index of the agent, $dW_n$ denotes the independent Brownian noise, and $\sigma$ is the coefficient of random noise. Each UAV aims to drive $\bar{s}_n$ to 0 by making requests for human interactions to adjust $\mu_n$. Without coordination, all UAVs may keep making requests, which may lead to huge demands for human resources. Therefore, a game-theoretic analysis is needed to ensure high performance while demanding low resources.

In the present disclosure, the scenario where UAVs execute repetitive/periodic tasks is considered. Then, the dynamics of resilience/loss rates can be periodic, and the human-machine interaction process can be modeled as a repeated non-cooperative game. Since the service loss and recovery rates may vary with periods and the machine requests in a single long period are discrete, the schedule of interaction requests in a statistical sense is developed to allow equation (5) for system description. In particular, $\lambda(t)$ and $\mu_n(t)$ are averaged over infinite trials in a fixed period $t \in [0, T]$.

Since available human resources for requests are determined by all existing requests, $\ell_n(\Omega_{\tilde{\mu}})$ is used to denote the aggregate cost of request processing where $\Omega_{\tilde{\mu}} := [\tilde{\mu}_1, \ldots, \tilde{\mu}_N]$ denotes the recovery of all agents and $\tilde{\mu}_n = \mu_n \bar{s}_n$. Then, the cost function for the n-th UAV is:

$$J_n(\bar{s}_n, \tilde{\mu}_n, \Omega_{\tilde{\mu}}) = \mathbb{E}\left[\int_t^T (\ell_n(\Omega_{\tilde{\mu}}) + Q\bar{s}_n^2 + R\tilde{\mu}_n^2)dt + V_T(\bar{s}_n(T))\right] \quad (6)$$

where Q and R>0 are tuning parameters; $Q\bar{s}_n^2$ is used to encourage decreasing the failure probability; $R\tilde{\mu}_n^2$ is used to penalize excessive requests; $V_T(\bar{s}_n(T))$ is the terminal cost for improving system stabilization. To avoid the communication requirements, MFG uses the time-varying probability distribution $m(\bar{s}, t)$ that satisfies $m(\bar{s}, t) \geq 0$ and $\int_0^1 m(\bar{s}, t)d\bar{s} = 1$ to approximate the request processing cost as follow:

$$\ell_n(\Omega_{\tilde{\mu}}) = S\left(\frac{1}{N}\sum_{\tilde{\mu}_n \in \Omega_{\tilde{\mu}}} \tilde{\mu}_n\right) \quad (7)$$
$$\approx S\left(\int_0^1 \tilde{\mu}_n \cdot m(\bar{s}, t)d\bar{s}\right) \triangleq \ell_n(m)$$

where $\ell_n(\Omega_{\tilde{\mu}})$ gives a measure of the average effect caused by all agents, and $S(\cdot)$ is a known function (aka, effect function) which models the congestion cost caused by a high volume of concurrent requests from all agents and is negatively related to the human processing efficiency depending on the volume of requests and other human factors. The optimal cost function can be obtained by the Hamilton-Jacobi-Bellman (HJB) equation as follows:

$$\frac{\partial}{\partial t}V_n(\bar{s}_n, t) + \frac{\sigma^2}{2}\frac{\partial^2}{\partial \bar{s}_n^2}V_n(\bar{s}_n, t) + \min_{\tilde{\mu}_n}\left[\frac{\partial}{\partial \bar{s}_n}V_n(\bar{s}_n, t)(-\tilde{\mu}_n + \lambda) + (\ell_n(m) + Q\bar{s}_n^2 + R\tilde{\mu}_n^2)\right] = 0 \quad (8)$$

with the boundary condition $V(\bar{s}, T) = V_T(\bar{s}(T))$ where $$V_n(\bar{s}_n, t) = \min_{\tilde{\mu}_n} J_n(\bar{s}_n, \tilde{\mu}_n, \Omega_{\tilde{\mu}}^*(-n)).$$

Then, $$\tilde{\mu}_n^* = \arg\min_{\tilde{\mu}_n} J_n(\bar{s}_n, \tilde{\mu}_n, \Omega_{\tilde{\mu}}^*(-n)) = \frac{1}{2R}\frac{\partial}{\partial \bar{s}_n}V_n(\bar{s}_n, t) \quad (9)$$

where $\Omega^*_{\tilde{\mu}}(-n)$ denotes the optimal actions of the agents other than the n-th UAV. Since the UAVs are homogeneous, the form of $\tilde{\mu}_n^*$ is identical across agents, thus the subscript n is removed. The HJB equation (8) depends on $m(\bar{s}, t)$ and its dynamics which can be described by the FPK equation as follows:

$$\frac{\partial}{\partial t}m(\bar{s},t) + \frac{\partial}{\partial \bar{s}}[-\bar{\mu}^*(\bar{s},t)m(\bar{s},t)] = \frac{\sigma^2}{2}\frac{\partial^2}{\partial \bar{s}^2}m(\bar{s},t) \quad (10)$$

with $m(0, 0)=1$. It is shown that the optimal policy for such non-cooperative game formulation is an $\epsilon_N$ Nash Equilibrium (NE).

The MFG features two coupled PDEs that must be solved simultaneously, i.e., the backward HJB equation (8) and the forward FPK equation (10). Due to the nonlinearity of those two coupled PDEs, obtaining exact analytical solution is almost impossible.

Mean field game of controls is a class of mean field games where infinitely numerous small agents control their own states and interact through a mean field of control where dynamics and payoffs depend on the joint distribution of the agents and their instantaneous control. This class of MFG is of particular interest to resilience analysis, as the actions of the other agents for interaction requests, rather than the states of the agents, affect the probability of failure and the dynamics of resilience, as excessive concurrent requests can slow down human processing. In particular, the dynamics of the probability of failure is modeled using a controlled stochastic differential equation (SDE) of the following form:

$$d\bar{s}_n(t) = [-\mu_n(t)d(p(\bar{s},\mu))]dt + \sigma dW_n \quad (11)$$

where $d(p(\bar{s},\mu)) = \exp(-\eta \int_{(\bar{s},\mu)} \mu p(\bar{s},\mu)d\bar{s}d\mu)$ with $\eta$ being a predefined coefficient and $p(\bar{s}, \mu)$ denoting the joint distribution is used to model the effect of request congestion and decreases with the increase of the expected request from all the agents. Given an initial state distribution $\bar{s}\sim m_0$ and a sequence of policies $\pi=\{\pi_k|k=0,1,\ldots,K\}$, a representative player may receive the cumulative sum of rewards defined as:

$$J(m_0, \pi, m^\pi) = \mathbb{E}\left[\sum_{k=1}^K r(\bar{s}_k, \mu_k, m_k) \mid \bar{s}_0 \sim m_0, \text{Eq. (11)}, \mu_k \sim \pi(\cdot \mid \bar{s}_k)\right] \quad (12)$$

Online mirror descent (OMD) is developed to scale up equilibrium computation in weekly monotone finite-state MFGs with an aversion to crowded areas. In particular, OMD alternates a step of evaluating current policy through the computation of expected accumulated pay-offs over time using a so-called Q-function with a step of improving that policy by computing the soft-max of the quantity obtained by integrating the Q-functions over iterations. Additionally, the Q-function is defined as:

$$Q_k^{\pi,m}(\bar{s}, \tilde{\mu}) = \quad (13)$$

$$\mathbb{E}\left[\sum_{t=k}^K r(\bar{s}_t, \tilde{\mu}_t, m_t) \mid \bar{s}_t = \bar{s}, \tilde{\mu}_t = \tilde{\mu}, \bar{s}_{t+1} = p(\cdot \mid \bar{s}_t, \tilde{\mu}_t), \tilde{\mu}_t \sim \pi_t(\cdot \mid \bar{s}_t)\right]$$

where $r(\bar{s}_t, \tilde{\mu}_t, m_t) = -\log(m_t(\bar{s}_t)) - \tilde{\mu}_t^2 - \bar{s}_t^2$ is the reward function with the first term representing the aversion of the player for crowded areas, $p(\cdot|\bar{s}_t, \tilde{\mu}_t)$ denotes the transition distribution, and $\pi_t(\cdot|\bar{s}_t)$ denotes the policy.

To employ OMD to obtain the solution to the MFG for resilience analysis, the time domain, state space, and action space are discretized. The performance of numerical methods for MFG can be quantified by exploitability, i.e., the average gain for a representative player to replace its policy with the best response $$\pi^{BR} = \operatorname*{argmax}_{\pi'} J(m_0, \pi', m^\pi)$$

while the population plays by policy $\pi$. Additionally, exploitability denoted by $\phi(\pi)$ is formulated as:

$$\phi(\pi) = \max_{\pi'} J(m_0, \pi', m^\pi) - J(m_0, \pi, m^\pi) \quad (14)$$

where $J(m_0, \pi', m^\pi)$ denotes the sum of rewards when the initial distribution is $m_0$, the representative player takes policy $\pi'$, and the population distribution sequence is $m^\pi$; and $J(m_0, \pi, m^\pi)$ is defined accordingly by referring to $J(m_0, \pi', m^\pi)$ in embodiments of the present disclosure.

A Nash equilibrium is a policy $\pi^*$ satisfying $\phi(\pi^*)=0$ by the definition. It is noted that the absolute value of the exploitability scales with rewards and thus its relative value to the exploitability of the initial policy is used to determine the early stopping of the algorithm. The procedure of the algorithm is summarized in Algorithm 1 as shown below.

Algorithm 1 for Mean Field Game of Controls

Input: An initial distribution $m_0^0$, an initial policy $\pi^0(\mu \mid \bar{s})$, a finite state space $\bar{S} = \{1, \ldots, L\}/L$, a finite action space $\mathcal{A} = \{1, \ldots, M\}/M$, maximal iterations $N_{iter}$, and tolerance $\epsilon_{tol}$.
Output: The optimal policy $\pi^+(\mu|\bar{s})$
1:      Compute the initial exploitability $e^0$ w.r.t. $\pi^0$;
2:      for i = 0 to $N_{iter}$ do
3:         $y^i = 0$;
4:         for k = 0 to N do
5:            Forward Update: Compute $m_k^i$ under policy $\pi_k^i$;
6:            Backward Update: Compute $Q^{\pi_k^i}$
7:         end for
8:         Update for all k, $\bar{s} \in \bar{S}$, $\mu \in \mathcal{A}$, $$y_k^{i+1}(\bar{s}, \mu) = y_k^i(\bar{s}, \mu) + \alpha Q^{\pi_k^i}(\bar{s}, \mu)$$

$$\pi_k^{i+1}(\cdot|\bar{s}) = \Gamma(y_k^{i+1}(\bar{s}, \mu))$$

9:         Compute the current exploitability $\epsilon^{i+1}$ and $$r_e = \frac{e^{i+1}}{e^0};$$

10:      if ($r_e < \epsilon_{tol}$) then
11:         break.

| Algorithm 1 for Mean Field Game of Controls |
| --- |
| 12:        end if |
| 13:        end for |
| 14:        return $\pi^{i+1}$ |

Additionally, in Algorithm 1, $$\Gamma(y) := \nabla h^*(y) = \arg\max_{p \in \Delta \mathcal{A}}[\langle y, p \rangle - h(\pi)],$$

where h: $\Delta \mathcal{A} \to \mathbb{R}$ is a ρ-strongly convex regularizer for some constant ρ>0 with $\Delta \mathcal{A}$ denoting the space of probability distributions over actions, and h*: $\mathbb{R}^{|\mathcal{A}|} \to \mathbb{R}$ denotes h's convex conjugate. Moreover, h is assumed to be steep.

Since the Q (i.e., Q function) learning is model-free, the dynamcs of the resilience is adapted based on the simulations of the multi-agent only cooperative positioning. However, it is noted the dynamic model determines the existence of a unique NE. In applications, a NE/near-optimal solution can be sufficient to improve the performance of the complete multi-agent system. Furthermore, OMD can be used for multi-population games with provable convergence to a NE under the monotonicity assumptions.

According to various embodiments of the present disclosure, the effects of human-on-the-loop on the resilience of the developed positioning approach is evaluated. In particular, the performance of the 4 modes described above are tested and compared under region-based attacks.

To reduce the computational complexity of trajectory planning in mode 2, it may only consider motion in the horizontal plane [0,31]×[0,31] and randomly generate 5 potential attack regions with the centers o~U([10,20]²) and the radiuses r~U(1,5). The target is $x_{target}$=[30 30]$^T$. The UAVs may be subject to two types of attacks. Advanced attack detection techniques with lower detection errors and trajectory planning algorithms beyond the capability of UAVs are used to represent human capacity rather than direct human participation, for extensive simulations that are prohibitive for human's participation and avoiding the effects of modeling of human-UAV collaborations on performance evaluation.

For mode 1, humans monitor the process of attack detection and mitigation and directly control the UAVs when necessary. For mode 2, prioritized planning is employed to plan trajectories that avoid potential attack regions and facilitate range-only positioning. In particular, 7000 nodes may be randomly sampled by the Halton distribution in the free space of the environments, and nodes may be connected to build an undirected graph for trajectory planning. For each node, 60 valid connections may be used. Additionally, a connection is said to be valid if the edge between two nodes does not cross the attack regions and the length of the edge lies between 0.9 and 1.1. For mode 3, operators take over the control when the UAV enters the area within 2 units distance of the target. For mode 4, humans only specify the target, and the UAVs use the approach.

Figure 2A:
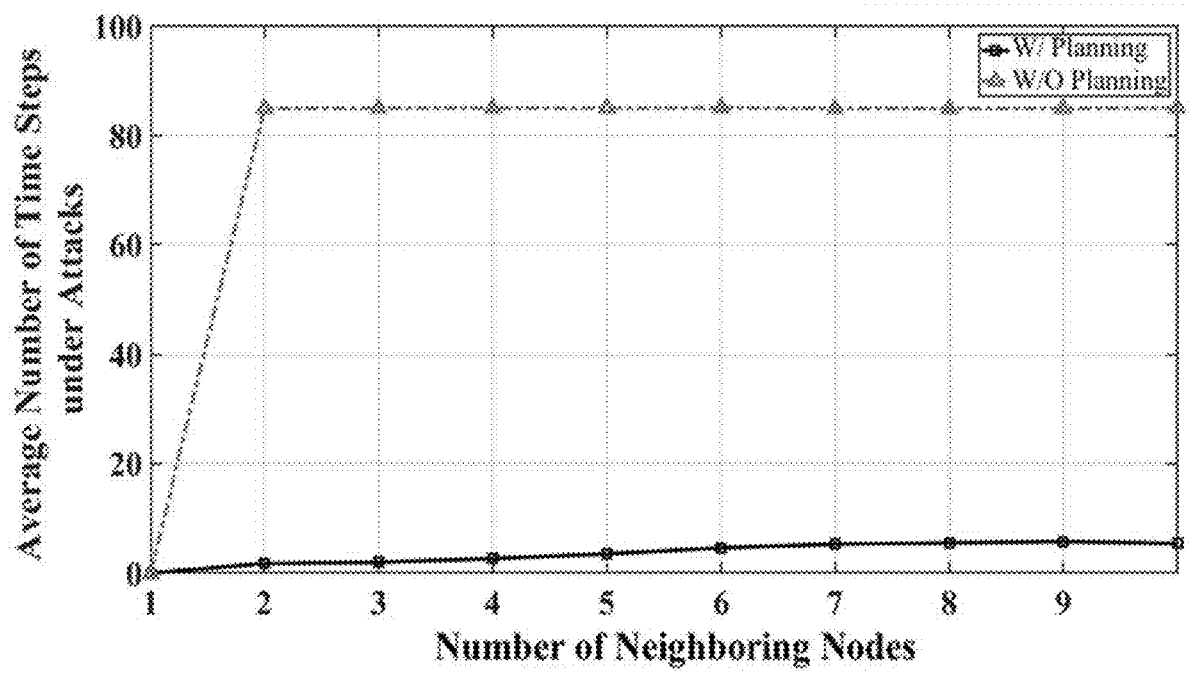
FIG. 2A depicts an exemplary schematic of comparison between average numbers of time steps under attacks with and without trajectory planning for different numbers of neighboring nodes according to various disclosed embodiments of the present disclosure.
Figure 2B:
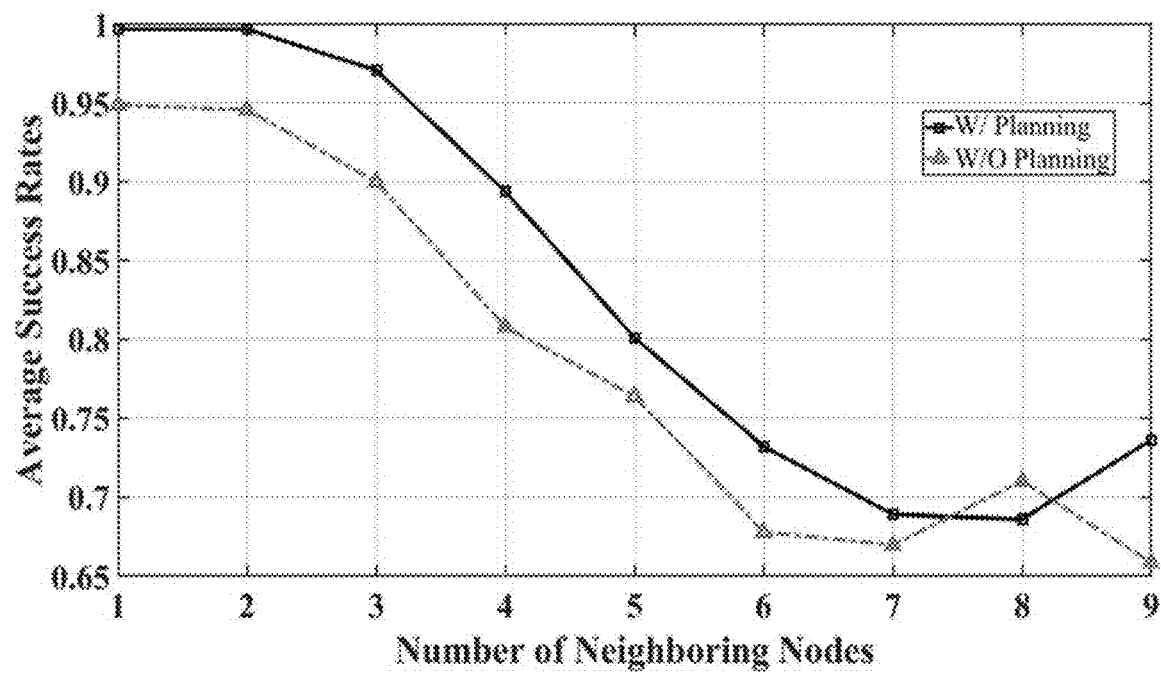
FIG. 2B depicts an exemplary schematic of comparison between average success rates with and without trajectory planning for different numbers of neighboring nodes according to various disclosed embodiments of the present disclosure.

As shown by FIG. 2A, trajectory planning can avoid the potential attack regions with a high probability, although the UAVs may still enter the attack regions due to positioning errors. FIG. 2B shows that using trajectory planning can increase the average success rates. Since there can be detection errors, using more neighboring nodes for consensus-based DEKF decreased average success rates.

According to various embodiments of the present disclosure, resilience analysis using MFG is described herein. The dynamics of resilience is described using a Markov decision process with a finite action space $\mathcal{A}$={0,1, . . . , M}/M representing the request from UAV for human interactions and a finite state space $\mathcal{S}$={0,1, . . . , L}/L representing the probability of failure, similar to the linear quadratic MFG. The human-machine interactions can decrease the probability of failure $\bar{s}$, as formulated by Equation (11). Moreover, the noise is discretized over {−3σ, . . . ,3σ}. At each time step, the agent receives the reward:

$$r(\bar{s}_k, \mu_k, \pi_k) = -\frac{1}{2}\mu_k^2 - \gamma \sum_{\bar{s} \in \mathcal{S}} \bar{s} p_k(\bar{s}) \qquad (15)$$

where $p_k(\bar{s}) = \sum_{\mu \in \mathcal{A}} p_k(\bar{s}, \mu)$ is the marginal distribution of $\bar{s}$, γ is a trade-off parameter that controls the relative importance, the terminal reward is r($\bar{s}$(T)), and p(T))=$-\gamma_T \sum_{\bar{s} \in \mathcal{S}} \bar{s} p_T$ ($\bar{s}$). The reward encourages decreasing expected probability of failure of the population and penalize excessive requests. In one embodiment, η=1 in the dynamic equation (11); M=L=10 for space discretization; γ=0.5 and $\gamma_N$=5 for the tuning parameters in the reward functions. Additionally, implementing the OMD algorithm is implemented in the present disclosure. The performance with and without using the optimal policy of MFG is compared to demonstrate the efficiency of resilience analysis via MFG. Additionally, each agent does not consider the actions of other agents and makes requests only based on its own states by $\mu_k = \bar{s}_k$ in the case without MFG.

Figure 3:
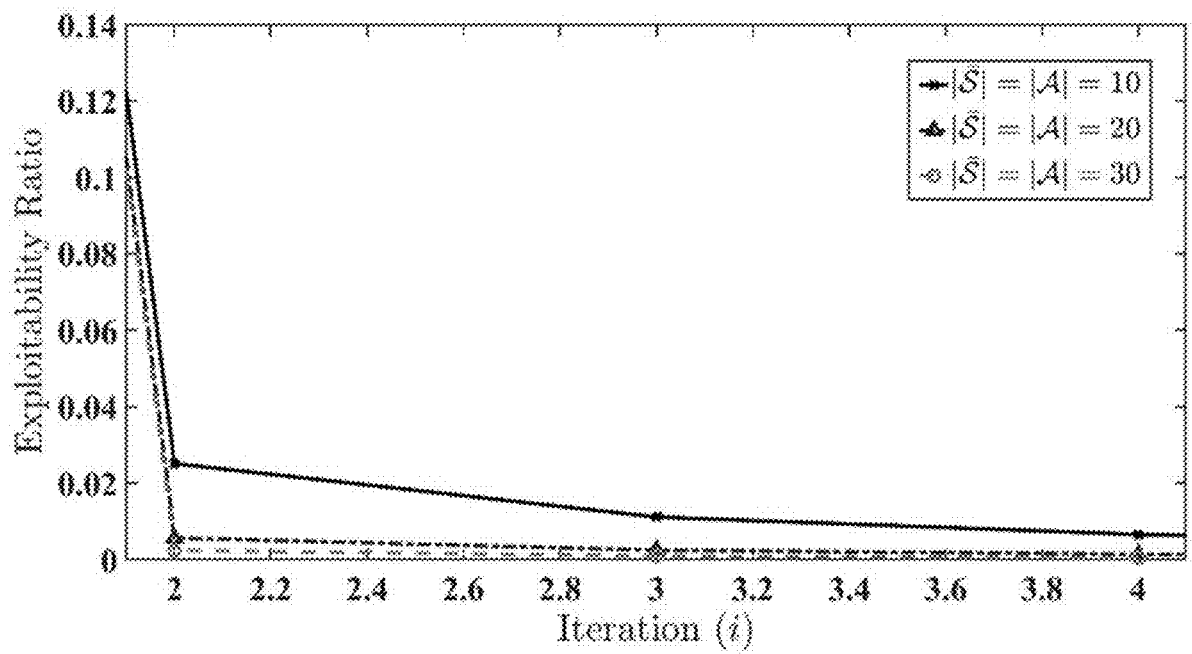
FIG. 3 depicts an exemplary schematic of a ratio of an i-th iteration exploitability to an initial exploitability for different cardinalities of state and action spaces according to various disclosed embodiments of the present disclosure.

FIG. 3 depicts an exemplary schematic of a ratio of the i-th iteration exploitability to the initial exploitability for different cardinalities of the state and action spaces according to various disclosed embodiments of the present disclosure. Referring to FIG. 3, the exploitability ratio may be quickly converged for different cardinalities of the state and action spaces including 10, 20 and 30.

Figure 4A:
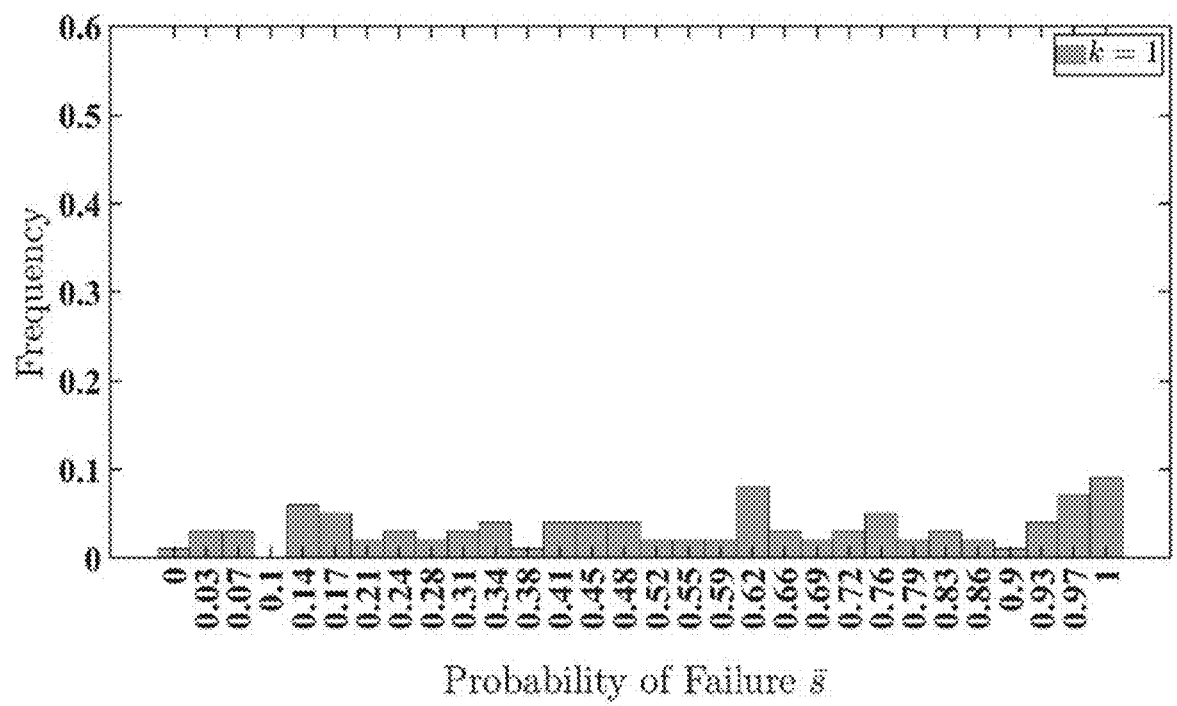
FIG. 4A depicts an exemplary schematic of the frequency of failure probability for time step k=1 according to various disclosed embodiments of the present disclosure.
Figure 4B:
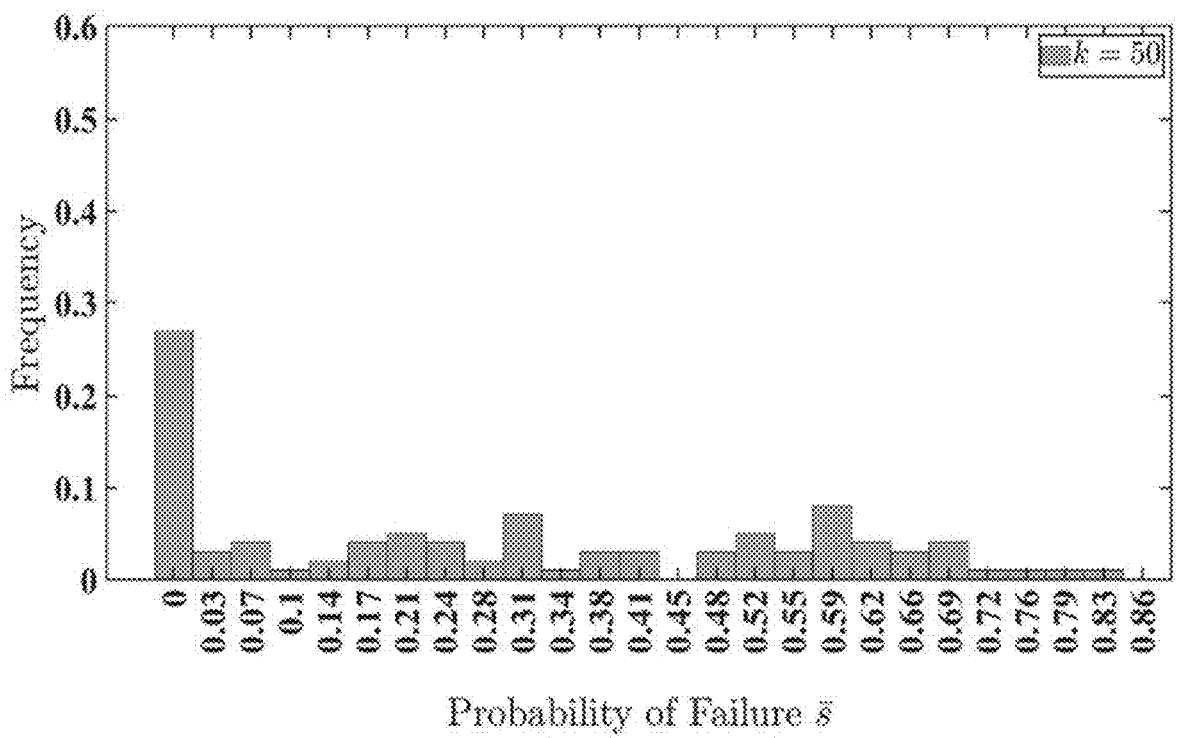
FIG. 4B depicts an exemplary schematic of the frequency of failure probability for time step k=50 according to various disclosed embodiments of the present disclosure.
Figure 4C:
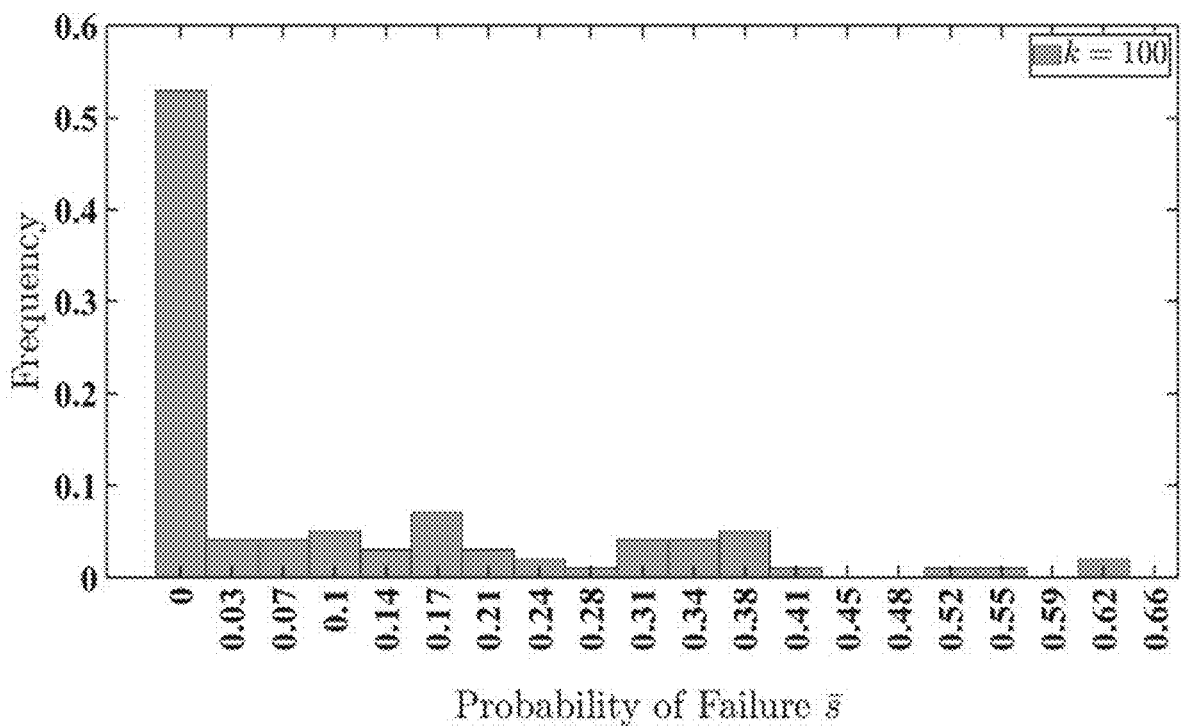
FIG. 4C depicts an exemplary schematic of the frequency of failure probability for time step k=100 according to various disclosed embodiments of the present disclosure.
Figure 4D:
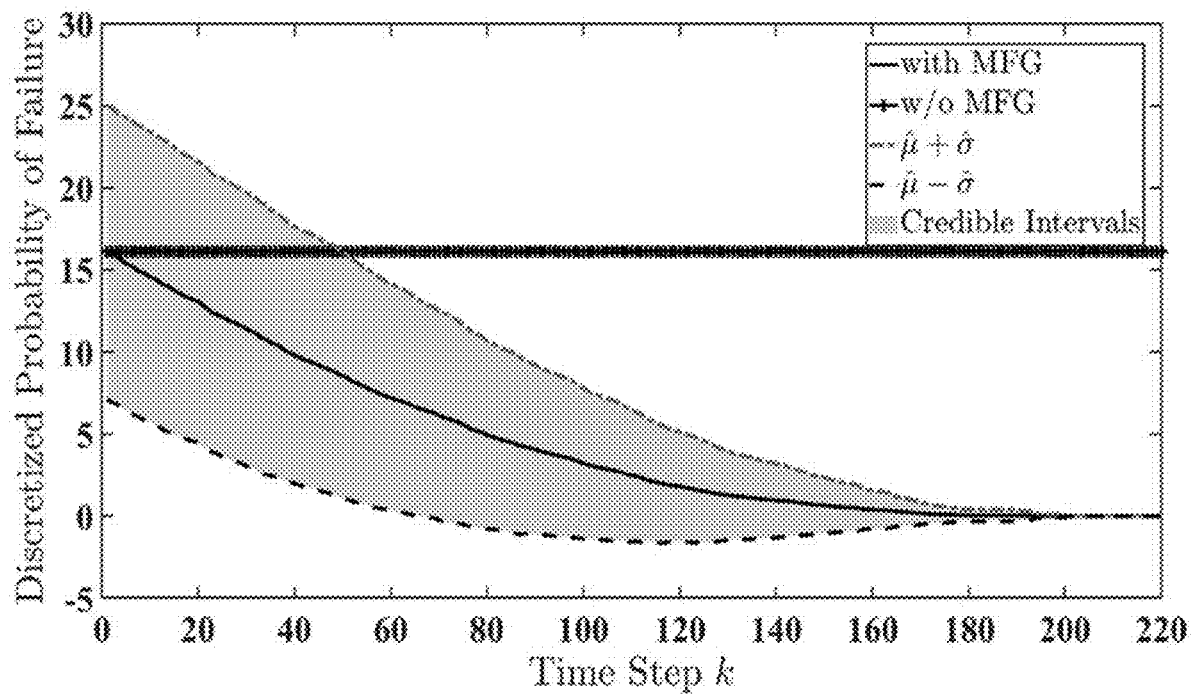
FIG. 4D depicts an exemplary schematic of mean and credible intervals of failure probability with time according to various disclosed embodiments of the present disclosure.
Figure 5A:
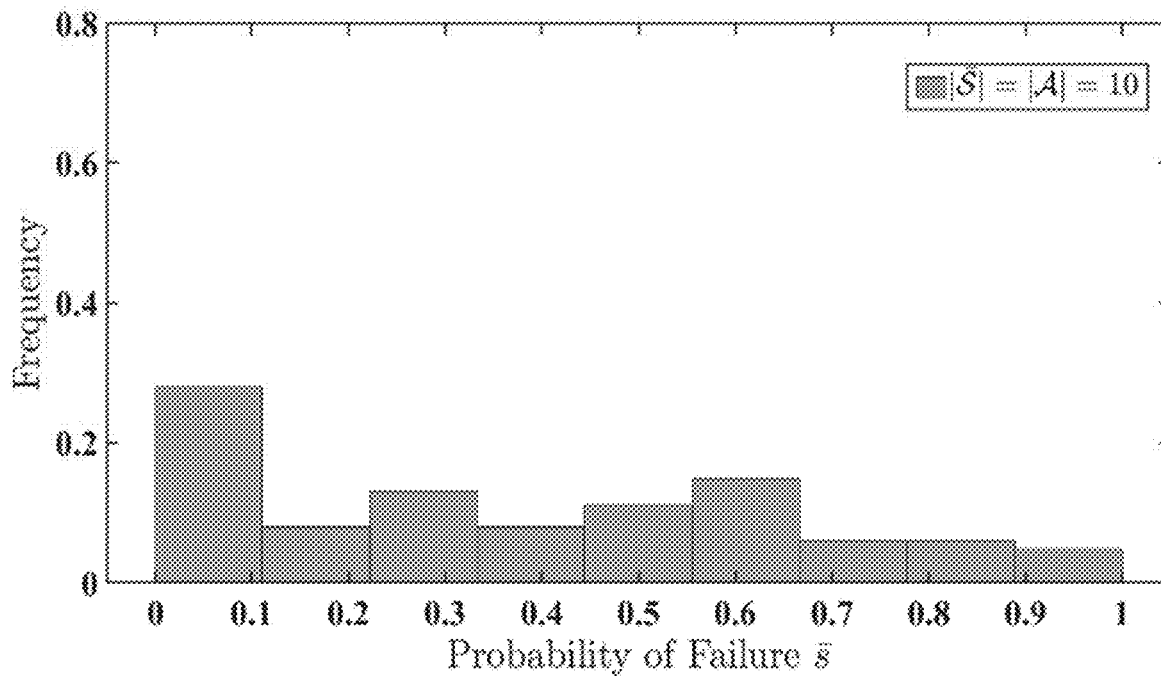
FIG. 5A depicts an exemplary schematic of the frequency of failure probability for the cardinality of the state and action space=10 at time step 100 according to various disclosed embodiments of the present disclosure.
Figure 5B:
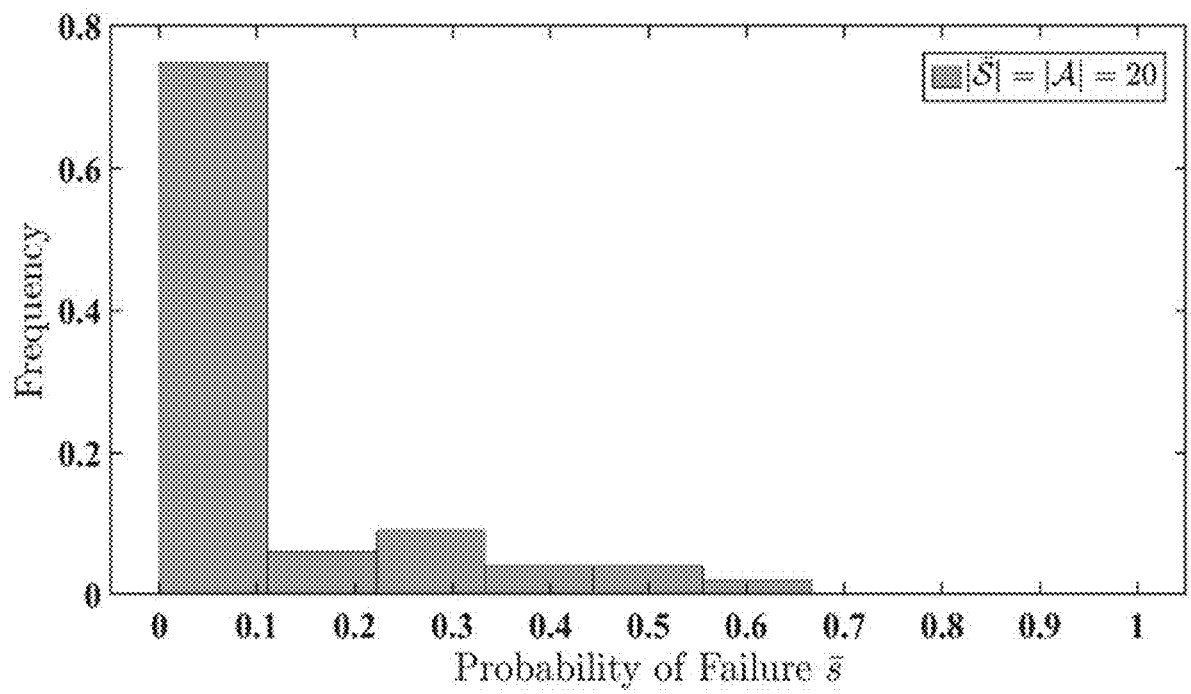
FIG. 5B depicts an exemplary schematic of the frequency of failure probability for the cardinality of the state and action space=20 at time step 100 according to various disclosed embodiments of the present disclosure.

FIG. 4A depicts an exemplary schematic of the frequency of failure probability for time step k=1 according to various disclosed embodiments of the present disclosure. FIG. 4B depicts an exemplary schematic of the frequency of failure probability for time step k=50 according to various disclosed embodiments of the present disclosure. FIG. 4C depicts an exemplary schematic of the frequency of failure probability for time step k=100 according to various disclosed embodiments of the present disclosure. FIG. 4D depicts an exemplary schematic of mean and credible intervals of failure probability with time according to various disclosed embodiments of the present disclosure. As shown in FIG. 4D, the shaded area shows the credible interval within 1 standard deviation (i.e., $\hat{\sigma}$) of the mean (i.e., $\hat{\mu}$) of samples. Referring to FIG. 4D, it shows that the mean of the probability of failure with the MFG may converge to 0 in 200 time steps while the population without MFG maintains high average probability of failure, where the agent number N=100, and the cardinality of the state and action space=30. Furthermore, the effects of the discretization on the numerical solutions to the MFG are evaluated. FIG. 5A depicts an exemplary schematic of the frequency of failure probability for the cardinality of the state and action space=10 at time step 100 according to various disclosed embodiments of the present disclosure. FIG. 5B depicts an exemplary schematic of the frequency of failure probability for the cardinality of the state and action space=20 at time step 100 according to various disclosed embodiments of the present disclosure.

Figure 5C:
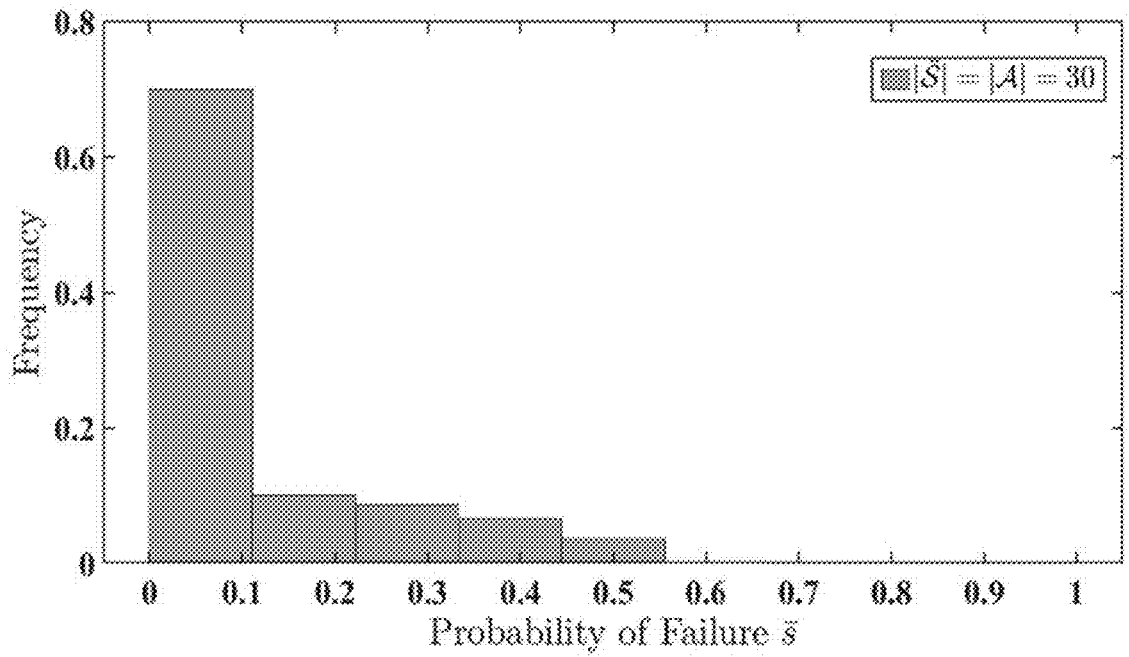
FIG. 5C depicts an exemplary schematic of the frequency of failure probability for the cardinality of the state and action space=30 at time step 100 according to various disclosed embodiments of the present disclosure.
Figure 6:
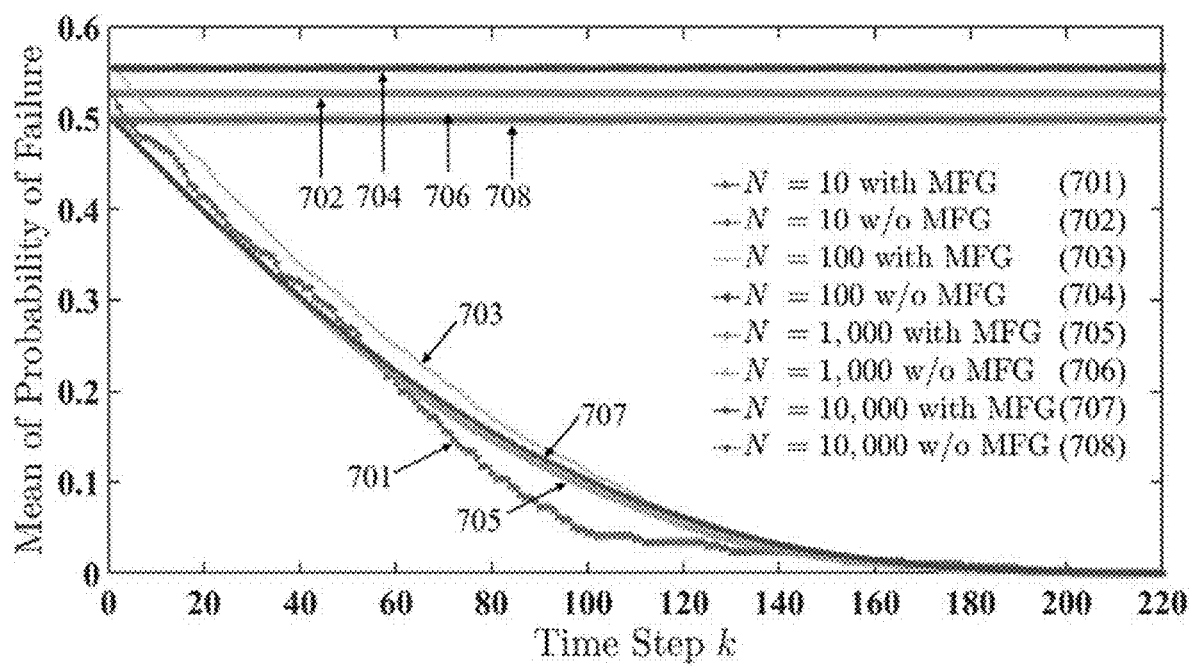
FIG. 6 depicts an exemplary schematic of a mean of failure probability with time for different numbers of agents according to various disclosed embodiments of the present disclosure.
Figure 7A:
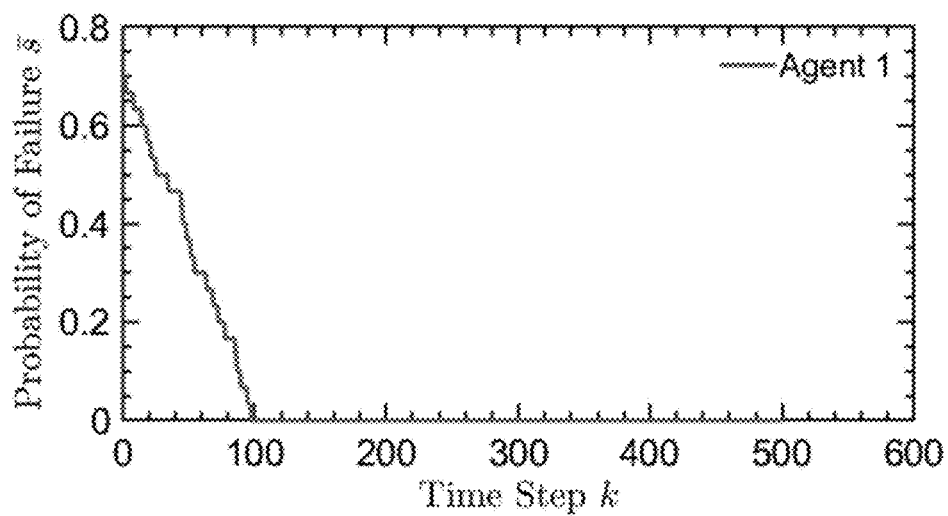
FIG. 7A depicts a schematic of state trajectory of an example agent using an optimal policy of mean field game (MFG) according to various disclosed embodiments of the present disclosure.
Figure 7B:
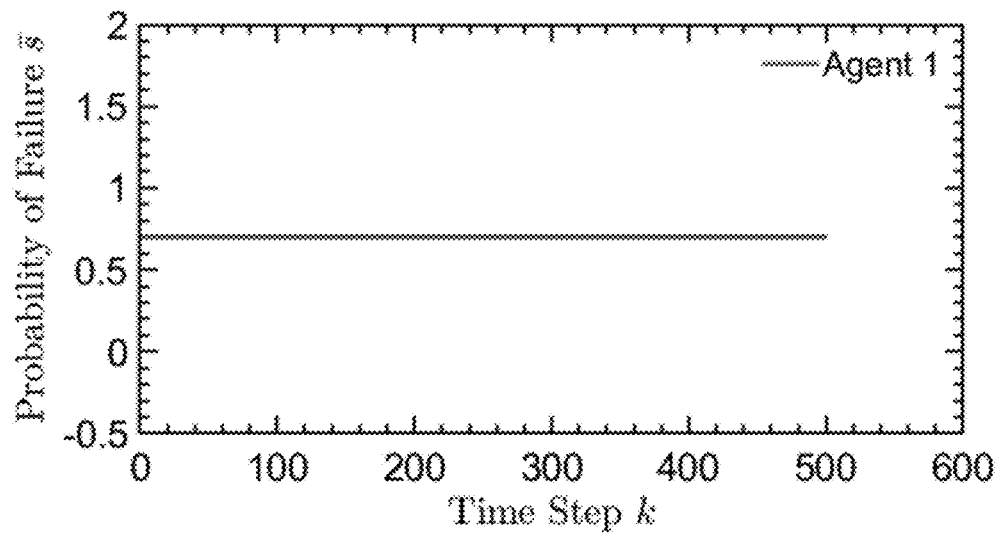
FIG. 7B depicts a schematic of state trajectory of an example agent without using an optimal policy of MFG according to various disclosed embodiments of the present disclosure.
Figure 7C:
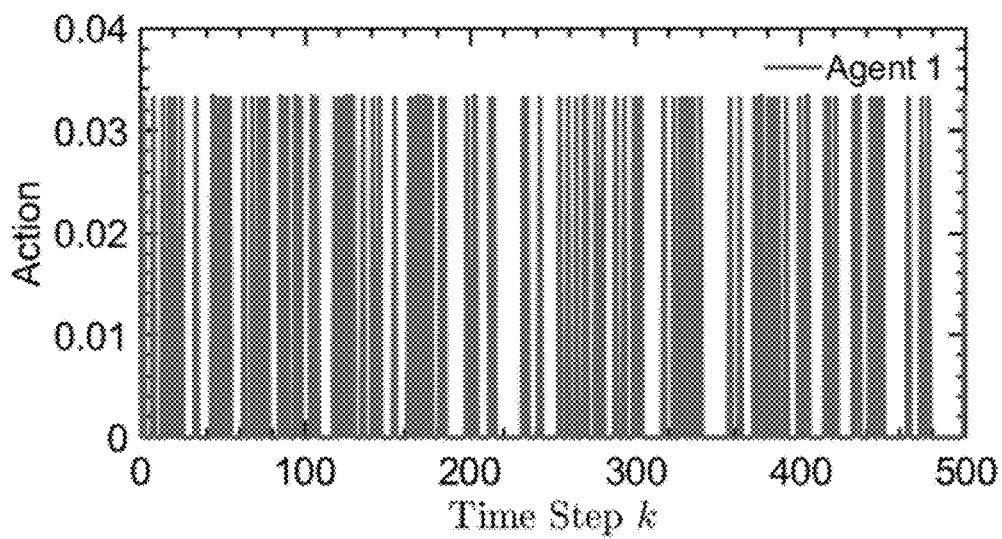
FIG. 7C depicts a schematic of state trajectory of an example agent using an optimal policy of MFG according to various disclosed embodiments of the present disclosure.
Figure 7D:
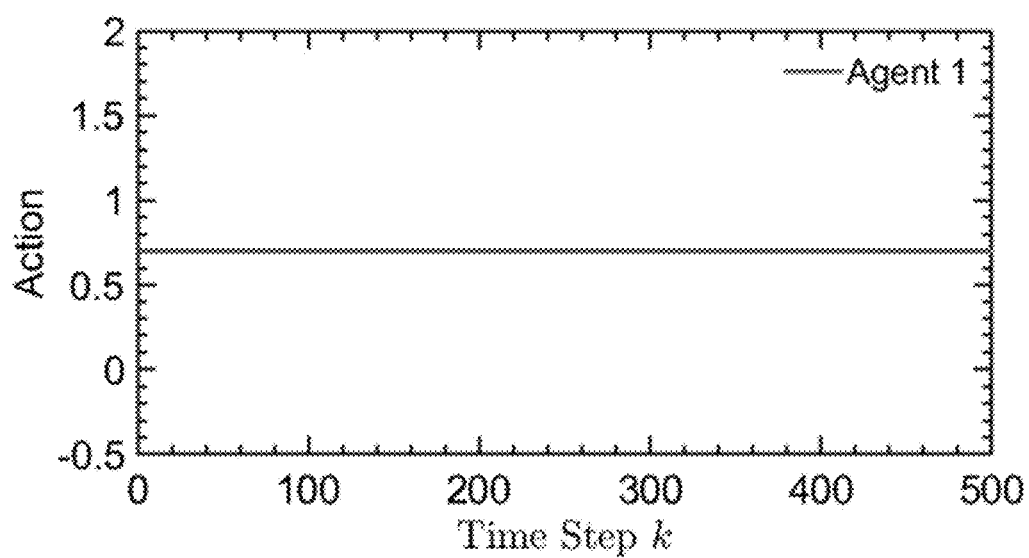
FIG. 7D depicts a schematic of state trajectory of an example agent without using an optimal policy of MFG according to various disclosed embodiments of the present disclosure.

FIG. 5C depicts an exemplary schematic of the frequency of failure probability for the cardinality of the state and action space=30 at time step 100 according to various disclosed embodiments of the present disclosure. It can be noted that increasing M and L may increase the performance of the optimal policy. Additionally, the benefits of using the optimal policy of the MFG for a small population when the conditions of the law of large numbers do not hold are evaluated. FIG. 6 depicts an exemplary schematic of a mean of failure probability with time for different numbers of agents (the cardinality of the state and action space is 30) according to various disclosed embodiments of the present disclosure. As shown in FIG. 6, the optimal policy of the MFG enables the population to reach 0 probability of failure while the mean of the probability of failure of the population without MFG remains high even when the number of agents is only 10. Referring to FIGS. 7A-7D, FIG. 7A depicts a schematic of state trajectory of the example agent 1 using an optimal policy of mean field game (MFG) according to various disclosed embodiments of the present disclosure; FIG. 7B depicts a schematic of state trajectory of the example agent 1 without using an optimal policy of MFG according to various disclosed embodiments of the present disclosure; FIG. 7C depicts a schematic of state trajectory of the example agent 1 using an optimal policy of MFG according to various disclosed embodiments of the present disclosure; and FIG. 7D depicts a schematic of state trajectory of the example agent 1 without using an optimal policy of MFG according to various disclosed embodiments of the present disclosure, where the agent number N=10, and the cardinality of the state and action space=30. As shown in FIGS. 7A-7D, the example agent 1 may significantly decrease the probability of failure using the optimal policy of the MFG. It should be noted that other agents may also significantly decrease the probability of failure using the optimal policy of the MFG. The 10 agents cannot significantly decrease the probability of failure without using the optimal policy of MFG due to the service congestion caused by the large volume of concurrent requests in the simulation horizon. Instead, the agents using the MFG solutions may present coordinated behaviors, and all 10 agents may achieve 0 probability of failure in around 200 time steps.

Various embodiments of the present disclosure provide a system. The system includes a memory, configured to store program instructions for performing a method of resilient human-on-the-loop range-only cooperative positioning of a plurality of unmanned aerial vehicles (UAVs); and a processor, coupled with the memory and, when executing the program instructions, configured for: determining an initial distribution, an initial policy, and a pre-defined tolerance value by a processer; computing an initial exploitability using the initial distribution and the initial policy; for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; performing a backward updating of a Q function of each UAV of the plurality of UAVs by computing a Q function value of each UAV of the plurality of UAVs at the k-th time step using a Q function value of each UAV of the plurality of UAVs at a (k+1)-th time step; for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration; computing an exploitability at the (i+1)-th iteration and a ratio of the exploitability at the (i+1)-th iteration over the initial exploitability; and if the ratio is less than or equal to the pre-defined tolerance value, maintaining a policy at the i-th iteration for each UAV of the plurality of UAVs; and if the ratio is greater than the pre-defined tolerance value, using the policy at the (i+1)-th iteration for each UAV of the plurality of UAVs.

Various embodiments of the present disclosure provide a non-transitory computer-readable storage medium, containing program instructions for, when being executed by a processor, performing a method of resilient human-on-the-loop range-only cooperative positioning of a plurality of unmanned aerial vehicles (UAVs). The method include determining an initial distribution, an initial policy, and a pre-defined tolerance value by a processer; computing an initial exploitability using the initial distribution and the initial policy; for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; performing a backward updating of a Q function of each UAV of the plurality of UAVs by computing a Q function value of each UAV of the plurality of UAVs at the k-th time step using a Q function value of each UAV of the plurality of UAVs at a (k+1)-th time step; for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration; computing an exploitability at the (i+1)-th iteration and a ratio of the exploitability at the (i+1)-th iteration over the initial exploitability; and if the ratio is less than or equal to the pre-defined tolerance value, maintaining a policy at the i-th iteration for each UAV of the plurality of UAVs; and if the ratio is greater than the pre-defined tolerance value, using the policy at the (i+1)-th iteration for each UAV of the plurality of UAVs.

From above-mentioned embodiments, it may be seen that at least following beneficial effects may be achieved in the present disclosure.

Resilient human-on-the-loop range-only cooperative positioning of plurality of UAVs can provide precise positioning under global positioning system (GPS)-denied environments. Various interaction modes of human-machine teaming may provide the flexibility to adjust the degree of human involvement and the level of resilience to the UAV operation scenarios. Simulations of human-on-the-loop range-only positioning through plurality of attack regions demonstrate that humans can enhance resilience of the positioning system. Communications among UAVs may be avoided for coordination of plurality of UAVs to request human interactions. A UAV may consider the aggregate effects of concurrent requests from plurality of UAVs to make requests for human interactions the using mean field game. The online mirror descent algorithm may be configured to solve mean field games and provide an optimal policy for a UAV to make requests or human interactions. Simulations of resilience analysis using mean field games demonstrate that the optimal policy facilitates coordination of plurality UAVs to make requests for human interactions without the need or cost of communications among UAVs. Resilience dynamics model for mean field game may be learned from data collected from simulations or experiments of human-on-the-loop range-only cooperative positioning of plurality of UAVs.

Although some embodiments of the present disclosure have been described in detail through various embodiments, those skilled in the art should understand that above embodiments may be for illustration only and may not be intended to limit the scope of the present disclosure. Those skilled in the art should understood that modifications may be made to above embodiments without departing from the scope and spirit of the present disclosure. The scope of the present disclosure may be defined by the appended claims.

What is claimed is:

1. A method of resilient human-on-the-loop range-only cooperative positioning of a plurality of unmanned aerial vehicles (UAVs), comprising:
    determining an initial distribution, an initial policy, and a pre-defined tolerance value by a processor;
    computing an initial exploitability using the initial distribution and the initial policy;
    for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; and performing a backward updating of a Q function of each UAV of the plurality of UAVs by computing a Q function value of each UAV of the plurality of UAVs at the k-th time step using a Q function value of each UAV of the plurality of UAVs at a (k+1)-th time step;
    for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration;
    computing an exploitability at the (i+1)-th iteration and a ratio of the exploitability at the (i+1)-th iteration over the initial exploitability; and
    when the ratio is less than or equal to the pre-defined tolerance value, controlling the UAV movement by maintaining a policy at the i-th iteration for each UAV of the plurality of UAVs by maintaining a policy at the i-th iteration; and when the ratio is greater than the pre-defined tolerance value, using the policy at the (i+1)-th iteration for controlling the movement of each UAV of the plurality of UAVs using the policy at the (i+1)-th iteration.

2. The method according to claim 1, wherein the dual variable at the (i+1)-th iteration is calculated by:

$$y_k^{i+1}(\bar{s}, \mu) = y_k^i(\bar{s}, \mu) + \alpha Q_k^{\pi^i}(\bar{s}, \mu)$$

wherein $\gamma$ denotes the dual variable, $\bar{s}$ denotes a UAV failure probability, $\mu$ denotes a recovery rate, $\alpha$ denotes a step size, Q denotes a Q-function, and $\pi$ denotes a policy.

3. The method according to claim 2, wherein the policy at the (i+1)-th iteration is calculated by:

$$\pi_k^{i+1}(\cdot \mid \bar{s}) = \Gamma\big(y_k^{i+1}(\bar{s}, \mu)\big)$$

wherein $\Gamma$ denotes a function that maps the dual variable at the (i+1)-th iteration to the policy at the (i+1)-th iteration.

4. The method according to claim 1, further including:
    inputting a plurality of discretized states and a plurality of discretized actions into a mean field game (MFG) model.

5. The method according to claim 4, wherein:
    a ratio of an exploitability at the (i+1)-th iteration to the initial exploitability is configured to determine early stopping of the mean field game model.

6. A system, comprising:
    a memory, configured to store program instructions for performing a method of resilient human-on-the-loop range-only cooperative positioning of a plurality of unmanned aerial vehicles (UAVs); and
    a processor, coupled with the memory and, when executing the program instructions, configured for:
        determining an initial distribution, an initial policy, and a pre-defined tolerance value by a processor;
        computing an initial exploitability using the initial distribution and the initial policy;
        for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; and performing a backward updating of a Q function of each UAV of the plurality of UAVs by computing a Q function value of each UAV of the plurality of UAVs at the k-th time step using a Q function value of each UAV of the plurality of UAVs at a (k+1)-th time step;
        for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration;
        computing an exploitability at the (i+1)-th iteration and a ratio of the exploitability at the (i+1)-th iteration over the initial exploitability; and
        when the ratio is less than or equal to the pre-defined tolerance value, controlling the UAV movement by maintaining a policy at the i-th iteration for each UAV of the plurality of UAVs by maintaining a policy at the i-th iteration; and when the ratio is greater than the pre-defined tolerance value, using the policy at the (i+1)-th iteration for controlling the movement of each UAV of the plurality of UAVs using the policy at the (i+1)-th iteration.

7. The system according to claim 6, wherein the dual variable at the (i+1)-th iteration is calculated by:

$$y_k^{i+1}(\bar{s}, \mu) = y_k^i(\bar{s}, \mu) + \alpha Q_k^{\pi^i}(\bar{s}, \mu)$$

wherein $\gamma$ denotes the dual variable, $\bar{s}$ denotes a UAV failure probability, $\mu$ denotes a recovery rate, $\alpha$ denotes a step size, Q denotes a Q-function, and $\pi$ denotes a policy.

8. The system according to claim 7, wherein the policy at the (i+1)-th iteration is calculated by:

$$\pi_k^{i+1}(\cdot \mid \bar{s}) = \Gamma(y_k^{i+1}(\bar{s}, \mu))$$

wherein $\Gamma$ denotes a function that maps the dual variable at the (i+1)-th iteration to the policy at the (i+1)-th iteration.

9. The system according to claim 6, wherein the processor is further configured to:
input a plurality of discretized states and a plurality of discretized actions into a mean field game (MFG) model.

10. The system according to claim 9, wherein:
a ratio of an exploitability at the (i+1)-th iteration to the initial exploitability is configured to determine early stopping of the mean field game model.

11. A non-transitory computer-readable storage medium, containing program instructions for, when being executed by a processor, performing a method of resilient human-on-the-loop range-only cooperative positioning of a plurality of unmanned aerial vehicles (UAVs); the method comprising:
determining an initial distribution, an initial policy, and a pre-defined tolerance value by a processer;
computing an initial exploitability using the initial distribution and the initial policy;
for an i-th iteration, for each time step, performing a forward updating of a distribution of a portion of the plurality of UAVs by computing a distribution of the portion of the plurality of UAVs at a k-th time step using a distribution of the portion of the plurality of UAVs at a (k−1)-th time step under a policy at the (k−1)-th time step; and performing a backward updating of a Q function of each UAV of the plurality of UAVs by computing a Q function value of each UAV of the plurality of UAVs at the k-th time step using a Q function value of each UAV of the plurality of UAVs at a (k+1)-th time step;
for each time step, calculating a dual variable at an (i+1)-th iteration using a dual variable at the i-th iteration and the computed Q function value of each UAV of the plurality of UAVs at the i-th iteration; and calculating a policy at the (i+1)-th iteration using the calculated dual variable at the (i+1)-th iteration;
computing an exploitability at the (i+1)-th iteration and a ratio of the exploitability at the (i+1)-th iteration over the initial exploitability; and
when the ratio is less than or equal to the pre-defined tolerance value, controlling the UAV movement by maintaining a policy at the i-th iteration for each UAV of the plurality of UAVs by maintaining a policy at the i-th iteration; and when the ratio is greater than the pre-defined tolerance value, using the policy at the (i+1)-th iteration for controlling the movement of each UAV of the plurality of UAVs using the policy at the (i+1)-th iteration.

12. The storage medium according to claim 11, wherein the dual variable at the (i+1)-th iteration is calculated by:

$$y_k^{i+1}(\bar{s}, \mu) = y_k^i(\bar{s}, \mu) + \alpha Q^{\pi_k^i}(\bar{s}, \mu)$$

wherein $\gamma$ denotes the dual variable, $\bar{s}$ denotes a UAV failure probability, $\mu$ denotes a recovery rate, $\alpha$ denotes a step size, Q denotes a Q-function, and $\pi$ denotes a policy.

13. The storage medium according to claim 12, wherein the policy at the (i+1)-th iteration is calculated by:

$$\pi_k^{i+1}(\cdot \mid \bar{s}) = \Gamma(y_k^{i+1}(\bar{s}, \mu))$$

wherein $\Gamma$ denotes a function that maps the dual variable at the (i+1)-th iteration to the policy at the (i+1)-th iteration.

14. The storage medium according to claim 11, wherein the processor is further configured to:
input a plurality of discretized states and a plurality of discretized actions into a mean field game (MFG) model.

15. The storage medium according to claim 14, wherein:
a ratio of an exploitability at the (i+1)-th iteration to the initial exploitability is configured to determine early stopping of the mean field game model.

* * * * *